(12) United States Patent
Park

(10) Patent No.: US 9,460,114 B2
(45) Date of Patent: Oct. 4, 2016

(54) SYSTEM FOR MANAGING RELATIONSHIP AND HISTORY OF COMBINED SPACE OF INTEREST (SOI) OBJECT AND CONTENT

(75) Inventor: Cheol-Woo Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 606 days.

(21) Appl. No.: 13/617,706

(22) Filed: Sep. 14, 2012

(65) Prior Publication Data

US 2013/0018883 A1     Jan. 17, 2013

Related U.S. Application Data

(63) Continuation-in-part of application No. 13/320,649, filed as application No. PCT/KR2010/003055 on May 14, 2010, now abandoned.

(30) Foreign Application Priority Data

May 15, 2009  (KR) .......................... 10-2009-0042401
Feb. 23, 2012  (KR) .......................... 10-2012-0018498

(51) Int. Cl.
*G06F 17/30* (2006.01)

(52) U.S. Cl.
CPC .............................. *G06F 17/30241* (2013.01)

(58) Field of Classification Search
CPC ................................................ G06F 17/30241
USPC .............. 707/736, 706, 713, 722, 758, 781, 707/999.005; 340/932.2; 701/533
See application file for complete search history.

(56) References Cited

U.S. PATENT DOCUMENTS

| 6,505,186 | B1 | 1/2003 | Muro et al. |
| 8,290,613 | B2 | 10/2012 | Shani |
| 2003/0061211 | A1 | 3/2003 | Shultz et al. |
| 2004/0068433 | A1 | 4/2004 | Chatterjee et al. |
| 2006/0064346 | A1 | 3/2006 | Steenstra et al. |
| 2006/0238379 | A1 | 10/2006 | Kimchi et al. |

(Continued)

FOREIGN PATENT DOCUMENTS

| EP | 2431938 A2 | 3/2012 |
| JP | H11-312233 A | 11/1999 |

(Continued)

OTHER PUBLICATIONS

International Search Report mailed Dec. 7, 2010 in corresponding PCT Application No. PCT/KR2010/003055.

(Continued)

*Primary Examiner* — Syling Yen
(74) *Attorney, Agent, or Firm* — Mintz Levin Cohn Ferris Glovsky and Popeo, P.C.; Peter F. Corless

(57) ABSTRACT

A system for managing a relationship or a history of a space of interest (SOI) containing information of a space having a certain area or structure and a content, the system comprising: an SOI-content selection unit configured to newly generate a desired SOI and contents or select the desired SOI or contents among existing SOIs or contents; a term of use setting unit configured to set a duration of use or a theme of use of the generated or selected SOI and contents; and an SOI-content relationship management unit configured to generate contents of an SOI that connects the generated or selected SOI and contents and configured to manage the contents of the SOI.

20 Claims, 12 Drawing Sheets

(56) References Cited

U.S. PATENT DOCUMENTS

| | | |
|---|---|---|
| 2007/0008181 A1* | 1/2007 | Rollert et al. ............. 340/932.2 |
| 2007/0083408 A1 | 4/2007 | Altberg et al. |
| 2008/0208690 A1 | 8/2008 | Lim |
| 2008/0288104 A1 | 11/2008 | Shani |
| 2009/0179895 A1 | 7/2009 | Zhu et al. |
| 2009/0287572 A1 | 11/2009 | Whelan |
| 2009/0327078 A1 | 12/2009 | Ohazama et al. |
| 2010/0023252 A1 | 1/2010 | Mays et al. |
| 2011/0093458 A1 | 4/2011 | Zheng et al. |
| 2012/0072448 A1 | 3/2012 | Kwon et al. |
| 2013/0245944 A1* | 9/2013 | Rutten et al. ................. 701/533 |

FOREIGN PATENT DOCUMENTS

| | | |
|---|---|---|
| JP | 2002-297654 | 10/2002 |
| JP | 2002-340604 | 11/2002 |
| JP | 2007-206608 | 8/2007 |
| KR | 10-2001-0056264 A | 7/2001 |
| KR | 10-2004-0028076 | 4/2004 |
| KR | 10-2005-0000225 | 1/2005 |
| KR | 10-2005-0119924 | 12/2005 |
| KR | 10-2008-0034272 | 4/2008 |
| KR | 10-2009-0044361 | 5/2009 |
| KR | 10-2010-0123264 A | 11/2010 |

OTHER PUBLICATIONS

Notice of Allowance mailed May 21, 2012 in corresponding Korean Application No. 10-2009-0042401.

* cited by examiner

SYSTEM FOR MANAGING RELATIONSHIP AND HISTORY OF COMBINED SPACE OF INTEREST (SOI) OBJECT AND CONTENT

CROSS-REFERENCE TO RELATED APPLICATIONS

This application claims priority under 35 U.S.C. §119(a) to Korean Patent Application No. 10-2012-0018498, filed Feb. 23, 2012. This application is also a continuation-in-part under 35 U.S.C. §120 of U.S. patent application Ser. No. 13/320,649, filed Nov. 15, 2011, which is a national phase application under 35 U.S.C. §371 of International Application No. PCT/KR2010/003055, filed May 14, 2010, which claim priority to Korean Patent Application No. 10-2009-0042401, filed May 15, 2009. The entire content of each of the above-referenced patent applications is hereby is incorporated by reference herein.

FIELD OF THE INVENTION

The present invention relates to a system for managing a relationship and a history of a combined space of interest (SOI) object and contents. More particularly, the present invention relates to a method capable of continuously managing the history of combining relationship of a space of interest (SOI) and contents even when at least one of the SOIs and the contents is deleted, moved, or modified. A space of interest (SOI) refers to a collection of data about a space of people's interest or use, can include points, lines and/or planes, and has unique identifying data. An SOI object refers to a structure which binds spatial information, identifying data and property information (e.g., color, thickness of line, type of line, time of exposure, allowed time of use, control of permission to access) of an SOI.

BACKGROUND OF THE INVENTION

Generally, a point of interest (POI) location information is expressed in an XY position coordinate value. When a particular POI is searched through a location information search service of a currently-available Internet portal, XY position coordinates of a corresponding POI are displayed as a point on a map of a certain scale.

FIG. 1 shows a search result of the POI "UNESCO House Building" by using an Internet portal location information search service. In the search result, particular XY position coordinates are marked on a map of Seoul. In a general location information database (DB), the "UNESCO House Building" is mapped to particular XY position coordinates. If a request for a search of "UNESCO House building" is received, position information on XY coordinates thereof is extracted and displayed on the map.

However, as shown in FIG. 1, the "UNESCO House building" occupies a space of a certain area on the map. Nevertheless, the search result is shown only by marking a point on the map. The reason is because the "UNESCO House building" is simply mapped to one XY position coordinate in the location information DB.

Specifically, in a case where a particular POI comprises several buildings as shown in FIG. 2, various buildings respectively have a certain area. In this case, in the POI search, only the XY coordinates of a particular building that is mapped in advance is displayed despite the fact that the particular POI occupies a wide area, and thus, the accuracy of providing geographic information may be lowered.

Furthermore, many buildings include multiple floors and tenants on each floor can be different companies. In addition, multiple companies can be located on the same floor of a building. Such geographic arrangements may not be represented fully if expressed in XY coordinates only (i.e. POI). Therefore, there is a growing need to add certain spatial information to geographic information to more accurately display the information.

Meanwhile, a service for providing a user with POI location information combined with a relevant content through the Internet is widely used. Generally, if a particular restaurant is searched, the POI location information of a corresponding restaurant combined with a relevant content of the corresponding restaurant is displayed.

FIG. 3 is a view showing a search result of a particular restaurant by a general Internet portal.

First, on a top portion of a screen, general characteristic information 10 such as, for example, a name, an address, a phone number, hours of operation of a corresponding restaurant is provided, and rating information 20 by actual customers such as, for example, reviews or blog reviews of the corresponding restaurant is shown in a bottom portion.

In addition to this information, POI location information of the corresponding restaurant is displayed on a map 30 of a certain scale, as shown on a top right portion of the screen.

However, here, the characteristic information 10, the rating information 20 and the POI location information 30 are directly connected with one another in a 1:1 relationship by using uniform resource locator (URL). In other words, based on the POI location information of the corresponding restaurant 30, a URL of a web page containing the characteristic information 10, a URL of a web page containing rating information of the corresponding restaurant, and a URL of a blog containing each blog review are directly mapped to one another.

In such a direct mapping approach using the URL, content such as the POI location information or property/rating information may be changed, and thus, there is a need for accurately managing and showing a history of changes. In some circumstances, even when address information is changed, old address information continues to be shown.

SUMMARY OF THE INVENTION

Accordingly, the present invention has been made in view of the above problems, and an object of the present invention is to provide a system that manages a connection relationship between a space of interest (SOI) containing information about a space having a certain area or structure and a group of contents in a form of a unique relationship ID.

Another object of the present invention is to provide a system that manages a history of changes of an SOI or content with respect to a combination relationship between the SOI and the contents.

In accordance with an aspect of the present invention, a system for managing a relationship or a history of a space of interest (SOI) containing information of a space having a certain area or structure and a content includes an SOI/content selection unit configured to newly generate a desired SOI or content or select the desired SOI or content among existing SOIs or contents; a term of use setting unit configured to set a duration of use or a theme of use of the generated or selected SOI or content; and an SOI-content relationship management unit configured to generate contents of an SOI that connects the generated or selected SOI or content and configured to manage the contents of the SOI. The SOI includes a unique SOI ID that specifies the SOI;

location information that indicates a location of the SOI; exterior appearance information that indicates an exterior appearance of the SOI; and SOI time information that indicates time at which the SOI is generated. When the theme of use includes a plurality of SOIs and the SOI is included in the theme of use, the SOI further includes SOI relationship information that indicates a relationship with other SOI. The SOI relationship information includes an SOI sequence number that sequentially indicates a relationship among the plurality of the SOIs. The contents includes: a unique content ID that specifies the contents; content information that indicates the contents; and content time information that indicates time at which the content is generated. When the theme of use includes a plurality of contents and the content is included in the theme of use, the content further includes content relationship information that indicates relationships with other contents. The content relationship information includes: a unique content ID that specifies the contents; and a unique sub content ID that specifies other contents included in the theme of use. The content relationship information includes a content sequence number that indicates a relationship among the plurality of the contents according to a content of the theme of use. The SOI-content relationship management unit manages the contents of the SOI through SOI-content relationship information (COS object), indicating a connection relationship between the generated or selected SOI and contents included in the contents of the SOI. SOI-content property information (COS property) indicates display property of the contents of the SOI. The SOI-content relationship information (COS object) and the SOI-content property information (COS property) include a unique relationship ID (COS Relation ID), which is directly mapped to the generated or selected SOI or content. The relationship ID (COS Relation ID) includes a unique SOI ID of the generated or selected SOI and a content ID of the generated or selected content. The SOI-content relationship information (COS object) includes: a relation user ID indicating a user who requests for a connection between the generated or selected SOI and contents; and relation mapping time indicating time at which the contents of the SOI is generated. The theme of use includes a plurality of contents of SOIs and the contents of the SOI is included in the theme of use, the SOI-content relationship information includes contents of SOI sequence number (COS sequence number) that sequentially indicates a relationship among the plurality of the SOIs. The SOI-content property information (COS property) includes: display information for visually displaying the contents of the SOI; scale information indicating a map scale of a map on which the contents of the SOI is displayed; and display device information indicating a type of a display device on which the contents of the SOI is displayed. The display information may include information about a type, a color, and a thickness of a line for visually representing the contents of the SOI, and the type, the color, the thickness of the line is controlled in response to the scale information or display device information.

In accordance with an aspect of the present invention, a system for managing a relationship or a history of an SOI containing information of a space having a certain area or structure and a content further includes: an SOI-content history management unit configured to manage a change history over time when at least one of the SOI, the contents, the SOI-content relationship information (COS object) or the SOI-content property information (COS property) is changed; and an SOI-content history recovery unit configured to search for the history of change in response to an external request and configured to show a search result. The SOI-content relationship information (COS object) and the SOI-content property information (COS property) are modifiable in response to an external request. The SOI-content history management unit is configured to determine, when at least one of the SOI, the contents, the SOI-content relationship information (COS object) or the SOI-content property information (COS property) is changed, whether a change is to be managed as the change history and configured to store a corresponding change that is determined to be managed as the change history in a change history database (DB) according to a type thereof.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
FIG. 1 is a view illustrating an example display of a general location information service.
Figure 2:
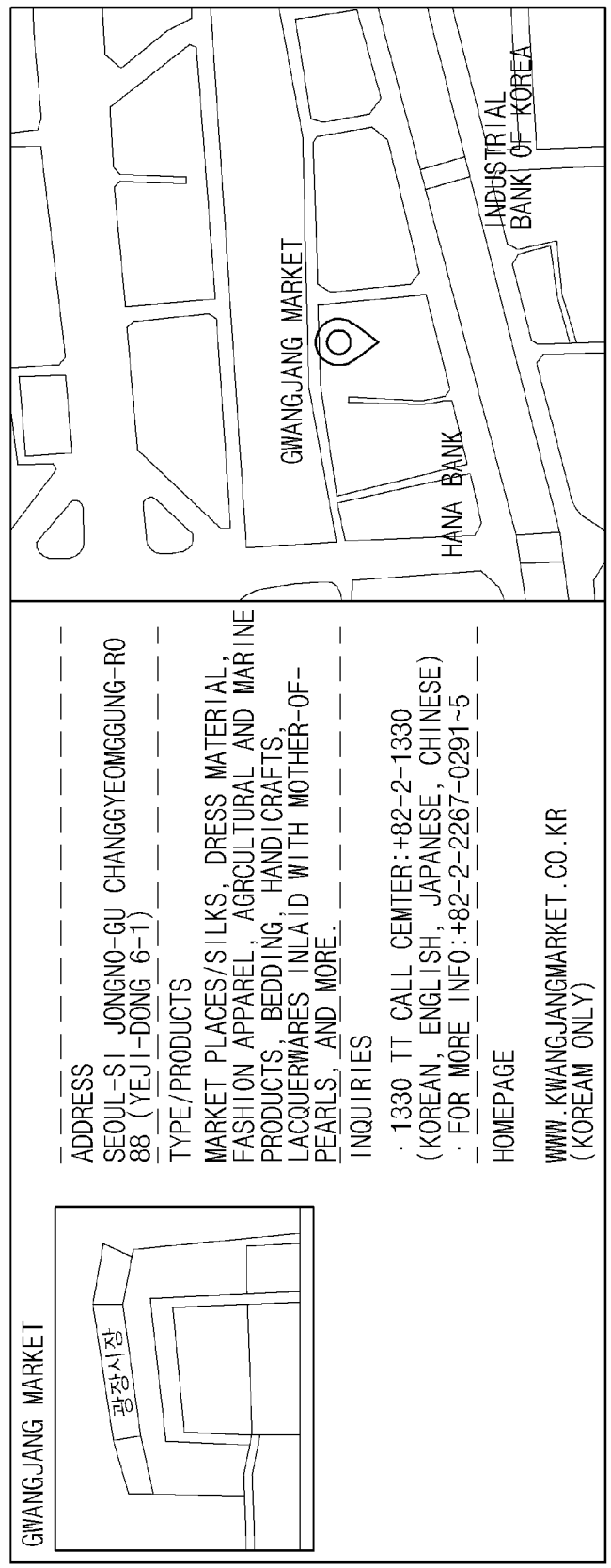
FIG. 2 is a screen showing a search result of a point of interest (POI) of a certain area.
Figure 3:
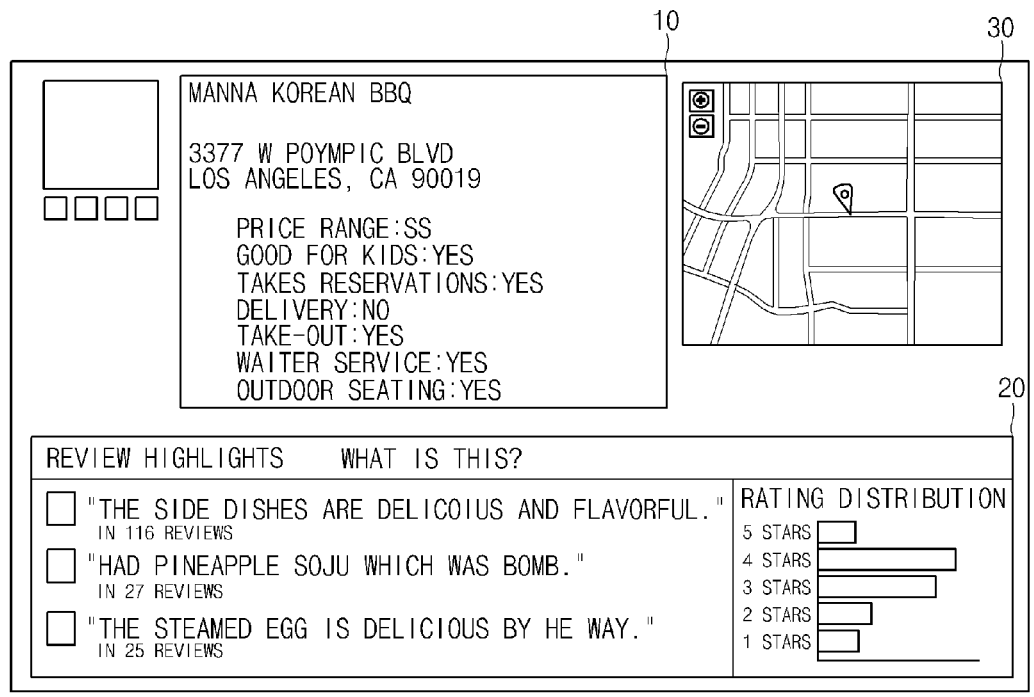
FIG. 3 is an example search result in which a POI and a content are combined.
Figure 4:
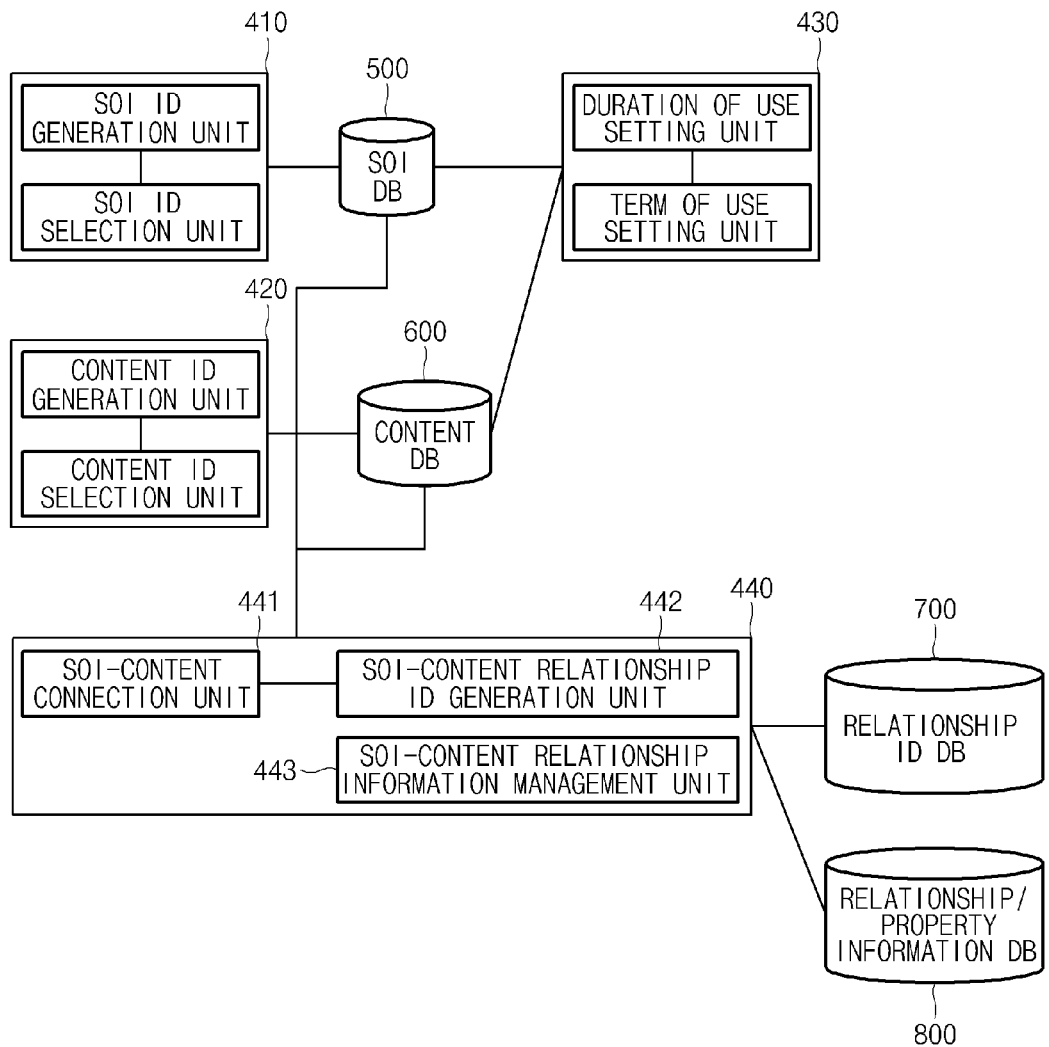
FIG. 4 is a schematic view illustrating a system for managing a relationship between a space of interest (SOI) and content according to the present invention.

FIG. 4 is a schematic view illustrating a system for managing a relationship between a space of interest (SOI) and contents according to the present invention. Referring to FIG. 4, an SOI/content selection unit includes an SOI selection unit 410 and a content selection unit 420.

First, the SOI/content selection unit 410 operates to newly create one or more SOIs to be stored in an SOI DB 500 or select a particular desired SOI among existing SOIs stored in the SOI DB 500.

Here, unlike a point of interest (POI), the SOI does not display XY position coordinates as a point but includes certain spatial information. For example, certain spatial information can include an area or structure so that, even when different objects are present on each floor of a building or various objects are present in the same floor, specific geographic information can be accurately provided. The spatial information can be expressed in a variety of formats including a set of 2D or 3D coordinates, one or more 2D or 3D shapes, and the like. In addition, the SOI itself has a hierarchical relationship structure and an SOI of a lower hierarchy of the created or selected SOI can also be created or selected. For example, if a particular building is the selected SOI, a lower SOI can be associated with each floor of the particular building to enable selection of a particular floor of the corresponding particular building. Hereinafter, the SOI will be described in more detail with reference to a separate drawing.

Figure 6A:
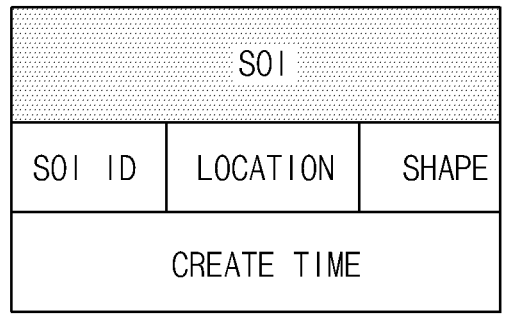
FIG. 6A is a view illustrating an SOI according to a preferable embodiment of the present invention.

FIG. 6A is a view illustrating an SOI according to a preferable embodiment of the present invention.

The SOI may include a unique SOI ID that specifies the SOI, location information indicating a location of the SOI, exterior appearance (or shape) information indicating an exterior appearance of the SOI, and SOI time information indicating time at which the SOI is created. In addition, when a theme of use includes a plurality of SOIs, the SOI can further include SOI relationship information (not shown) sequentially indicating a relationship with other SOI. For example, if a particular theme of use is lunch, a plurality of SOIs related to lunch can include an SOI that is a restaurant and another SOI that is a café. In this case, assuming that a person generally drinks tea or coffee at a café after dining at a restaurant, the SOI relationship information of the SOI representing the restaurant can be "1" and the SOI relationship information representing the café can be "2." Depending on a specific theme of use, the SOI relationship information can be varied.

Referring now to FIG. 4, the SOI selection unit 410 can include an SOI ID generation unit that newly generates one or more desired SOI and an SOI ID selection unit that selects a particular desired SOI among the existing SOIs stored in the SOI DB 500.

Similarly to the SOI selection unit 410 described above, the content selection unit 420 operates to newly create one or more contents to be stored in a content DB 600 or select a particular content among existing contents stored in the SOI DB 600. An operation of the content selection unit 420 is similar to an operation of selecting the SOI. Hereinafter, contents will be described in more detail with reference to a separate drawing.

Figure 6B:
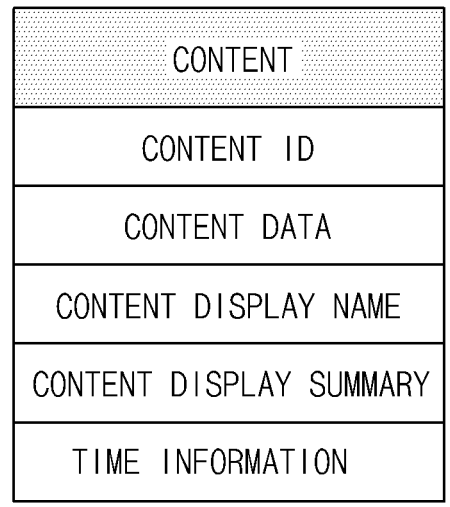
FIG. 6B is a view illustrating contents according to a preferable embodiment of the present invention.

FIG. 6B is a view illustrating contents according to a preferable embodiment of the present invention.

A group of contents can include a unique content ID that specifies contents, content data indicating contents, and content time information indicating time at which the contents are created. In addition, when a theme of use includes a plurality of groups of contents, the contents can further include content relationship information sequentially indicating a relationship with other content. Hereinafter, the content relationship will be described in more detail with reference to a separate drawing.

Figure 6C:
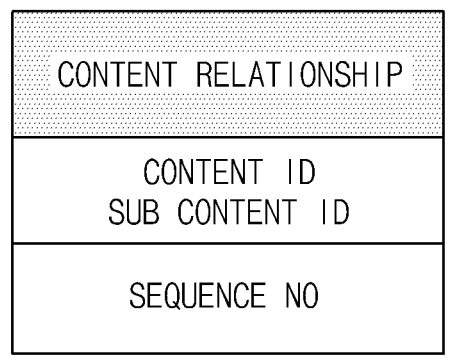
FIG. 6C is a view illustrating content relationship information according to a preferable embodiment of the present invention.

FIG. 6C is a view illustrating content relationship information according to a preferable embodiment of the present invention.

The content relationship information can include a unique content ID that specifies contents related to the theme of use and another unique content ID that specifies other contents related to the theme of use. Also, the content relationship information can further include a content sequence number indicating a sequential relationship among a plurality of contents depending on contents of the theme of use. For example, if a particular theme of use is lunch, a plurality of contents related to lunch can include a group of contents that is related to dining and another group of contents that is related to tea drinking. In this case, a content ID specifies dining and another content ID specifies tea drinking.

Assuming that a person generally drinks tea after dining, the content sequence number included in the content relationship information of the content representing dining can be "1" and the content sequence number included in the content relationship information of the content representing tea drinking can be "2." Depending on a particular theme of use, the content relationship information may be varied.

Referring now to FIG. 4, the content selection unit 420 can include a content ID generation unit that newly generates one or more desired contents and a content ID selection unit that selects a particular desired content among existing contents stored in the content DB 600.

A term of use setting unit 430 provides a function to enable setting a duration of use or a theme of use with respect to the SOI or content generated or selected by the SOI selection unit 410 and/or the content selection unit 420. Here, the duration of use includes a use commencement date and a use termination date. In addition, the theme of use includes information such as, for example, category classification, themes, events, or promotions. According to a preferred embodiment of the present invention, the duration of use and the theme of use can be set to have a correlation therebetween.

A SOI-content relationship management unit 440 operates to generate contents of SOI, in which the SOI or content each generated or selected by the SOI selection unit 410 and the content selection unit 420 is connected, and to manage the generated contents of SOI. To this end, the SOI-content relationship management unit 440 specifically includes an SOI-content connection unit 441, an SOI-content relationship ID generation unit 442, and an SOI-content relationship information management unit 443.

The SOI-content connection unit 441 generates and edits the SOI-content relationship information (COS object) indicating a connection relationship between generated or selected SOIs or contents included in the content of the SOI and SOI-content property information indicating display property of the content of the SOI. Hereinafter, the SOI-content relationship information (COS object) will be described in more detail with reference to a separate drawing.

Figure 6D:
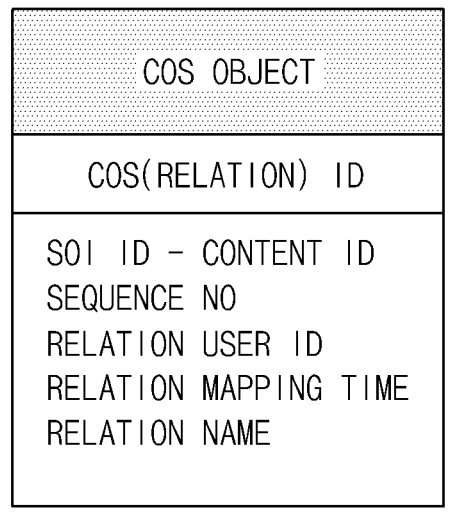
FIG. 6D is a view illustrating SOI-content relationship information (COS object) according to a preferable embodiment of the present invention.

FIG. 6D is a view illustrating SOI-content relationship information (COS object) according to a preferable embodiment of the present invention.

The SOI-content relationship information (COS object) specifically indicates a connection relationship between the SOI and the contents. To this end, the SOI-content relationship information (COS object) can include a unique relationship ID (COS Relation ID), which is directly mapped to the generated or selected SOI and contents. In addition, the SOI-content relationship information (COS object) can include a relation user ID indicating a user who requests for connection between the generated or selected SOI and the contents and relation mapping time indicating time at which the contents of the SOI are generated. Also, when a plurality of groups of contents of SOIs are included in a particular theme of use, the SOI-content relationship information can further include a content SOI sequence number sequentially indicating relationships among the plurality of contents of SOIs. For example, the SOI-content relationship information (COS object) can indicate whether the SOI and the contents is connected as 1:1, 1:N, N:1 or N:N (N is a natural number equal to or greater than 2). Hereinafter, the SOI-content property information (COS property) will be described in more detail with reference to a separate drawing.

Figure 6E:
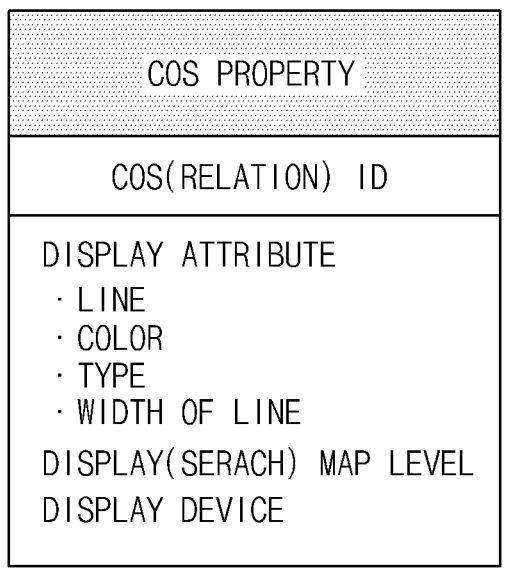
FIG. 6E is a view illustrating SOI-content property information (COS property) according to a preferable embodiment of the present invention.

FIG. 6E is a view illustrating SOI-content property information (COS property) according to a preferable embodiment of the present invention.

The SOI-content property information (COS property) represents display property of the contents of the SOI more specifically. To this end, the SOI-content property information (COS property) includes a unique relationship ID (COS Relation ID) that is directly mapped to the generated or selected SOI or content. In addition, the SOI-content property information (COS property) can include display information for visually displaying the contents of SOI, map scale information indicating a map scale of a map on which the content of the SOI, and display device information indicating a type of a display device on which the contents of the SOI are displayed. Also, the display information can include information such as a type, a color, and a thickness of a line for visually representing the contents of the SOI, and the type, the color, the thickness of the line included in the display information can be controlled in response to the map scale information or display device information. For example, the SOI-content property information (COS property) can be implemented as information that controls, for example, a type of the display device, whether to display a list, whether to display a summary/information inquiry on screen, whether to display on the map, whether to output an electronic file, or whether to print a hard copy.

Referring now to FIG. 4, the SOI-content relationship ID generation unit 442 generates a unique relationship ID (COS Relation ID) that is an identification code that represents mapping to the generated or selected SOI or content. Such relationship ID (COS Relation ID) is an identification code that is uniquely set according to the duration of use or the theme of use set by the terms of use setting unit 430 and uniquely represents mapping to the generated or selected SOI and contents. Hereinafter, the relationship ID (COS Relation ID) will be described in more detail with reference to a separate drawing.

Figure 7:
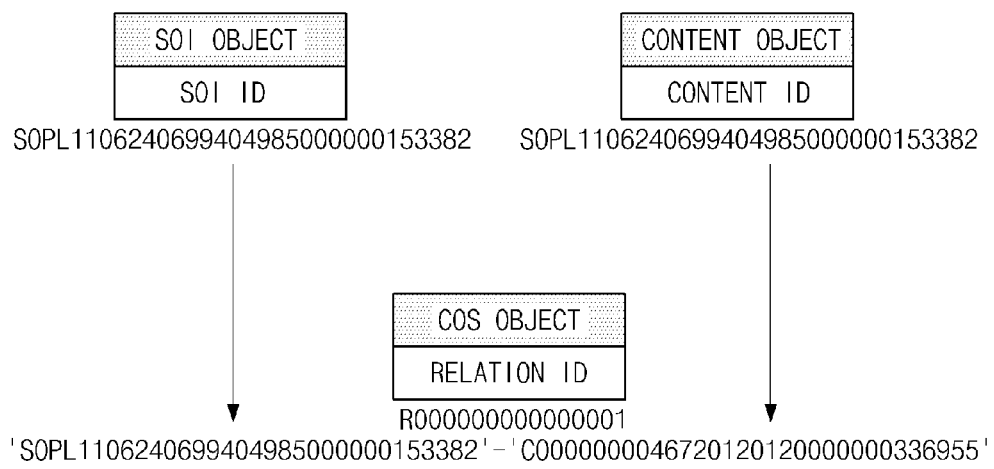
FIG. 7 is a view illustrating a relationship ID (COS Relation ID) according to a preferable embodiment of the present invention.

FIG. 7 is a view illustrating a relationship ID (COS Relation ID) according to a preferable embodiment of the present invention. The relationship ID of FIG. 7 can comprise a unique SOI ID of the generated or selected SOI and a content ID of the generated or selected contents.

Referring yet again to FIG. 4, the SOI-content relationship information management unit 443 manages the relationship ID (COS Relation ID), the SOI-content relationship information (COS object) or the SOI-content property information (COS property) in association with a relationship ID DB 700 and a relationship/property information DB 800 in which the relationship ID (COS Relation ID), the SOI-content relationship information (COS object) or the SOI-content property information (COS property) are respectively stored. Further, if a change is made to the above information, a corresponding change can be reflected in the relationship ID DB 700 and the relationship/property information DB 800. For example, an SOI ID of a corresponding SOI, location information, exterior appearance information, SOI time information or SOI relationship information can change, or the corresponding SOI or contents itself can be deleted, or the relationship information (COS object) or the SOI-content relationship information (COS property) can be changed or deleted. In addition, the SOI-content relationship information (COS object) and the SOI-content property information (COS property) can be modified in response to an external request when needed.

Figure 5:
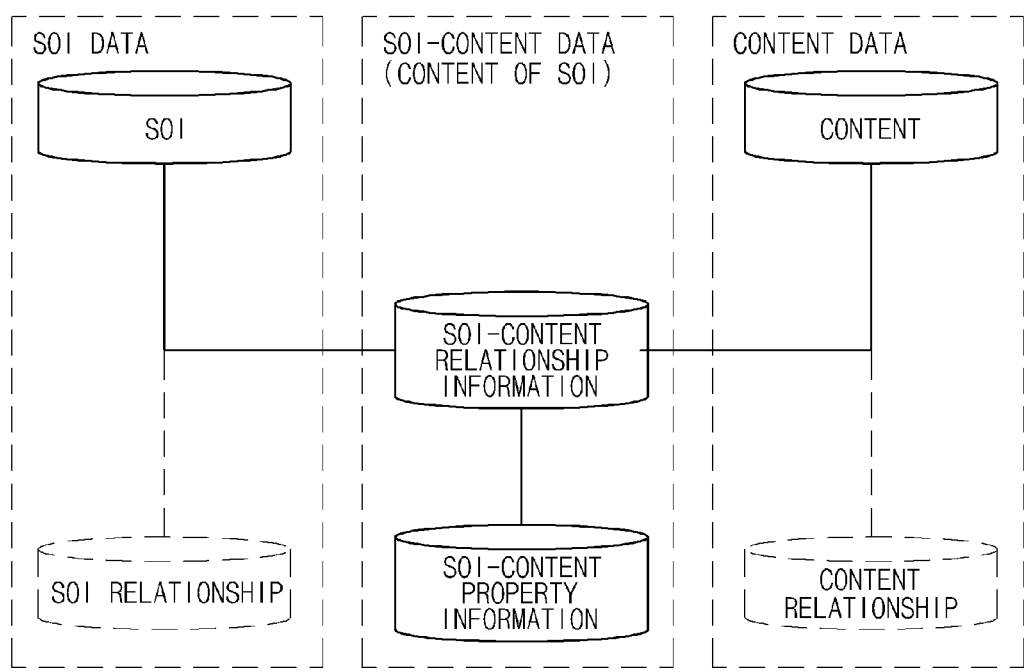
FIG. 5 is a view illustrating a relationship between an SOI datum, a content datum, and an SOI-content datum according to the present invention.

FIG. 5 is a view illustrating a relationship between SOI data, content data and SOI-content data in an embodiment of the present invention.

The SOI data contains the SOI that constitutes information about the SOI. Also, as described above, when the particular theme of use includes a plurality of SOIs, the SOI data can further include SOI relationship information indicating sequential relationship information (SOI Relationship) between the SOI and other SOI.

The contents data contains the contents that contain information about the contents. Also, as described above, when the particular theme of use includes a plurality of contents, the content data can further include content relationship information indicating sequential relationship information (Content Relationship) between the contents and other contents.

The SOI-content data that constitutes information of contents of SOI includes the SOI-content relationship information (COS object) and the SOI-content property information (COS property). As described above, the SOI-content relationship information (COS object) indicates a connection relationship between the generated or selected SOI or contents and the SOI-content property information (COS property) can indicate a display property of the contents of the SOI.

Figure 8:
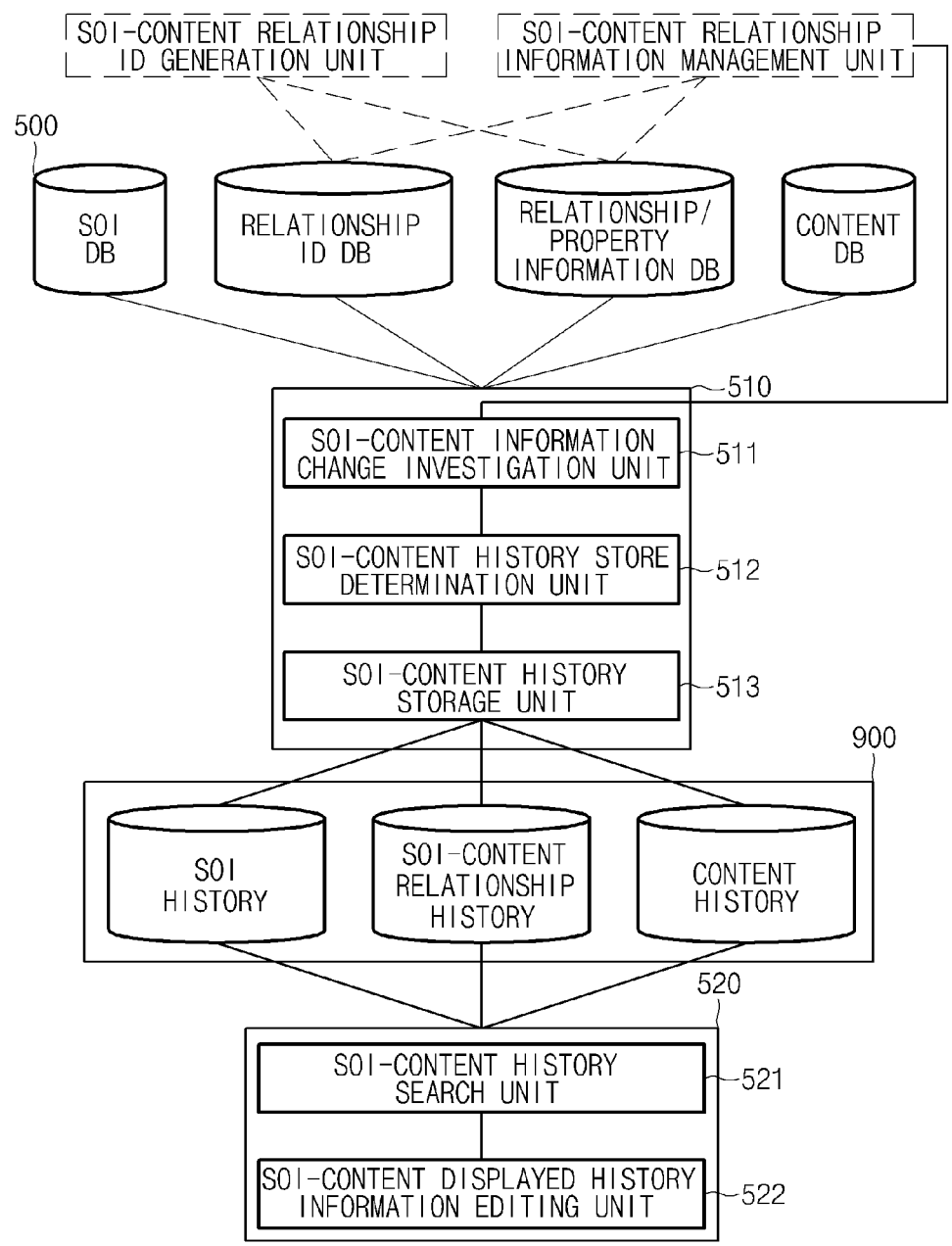
FIG. 8 is a view illustrating a system for history management and history recovery according to the present invention.

FIG. 8 is a view illustrating an operation of a function, which can manage a change history of the SOI, the contents, the SOI-content relationship information (COS object) or the SOI-content property information (COS property) and provide information about the change history.

An SOI-content history management unit 510 monitors the SOI DB 500, the content DB 600, the relationship ID DB 700, and the relationship/property information DB 800 to investigate a change in information stored therein. When it is determined that the change needs to be managed as a change history, the change is stored in a change history DB 900. To this end, the SOI-content history management unit 510 can include an SOI-content information change investigation unit 511, an SOI-content history store determination unit 512, and an SOI-content history storage unit 513.

When the SOI, the contents, the SOI-content relationship information (COS object) or the SOI-content property information (COS property) is changed, the SOI-content information change investigation unit 511 investigates a corresponding change from the relevant DB 500, 600, 700, or 800 and classifies the corresponding change to a predefined type code. Here, the type code can, for example, be 'modify' or 'delete' of the relationship information, 'display' of the property information, or 'control' of an output.

The SOI-content history storage determination unit 512 operates to determine whether the change investigated by the SOI-content information investigation unit 511 corresponds to the type code that is to be stored as the change history.

The SOI-content history storage unit 513 stores the change as the change history in an SOI history DB, an SOI-content relationship history DB or a content history DB included in the change history DB 900, wherein information about time at which the change is generated is necessarily included.

An SOI-content history recovery unit 520 searches for a change history of the SOI, the content, the SOI-content relationship information (COS object) or the SOI-content property information (COS property) and shows a search result. In other words, a change history is searchable. To this end, the SOI-content history recovery unit 520 can include an SOI-content history search unit 521 and an SOI-content displayed history information editing unit 522.

The SOI-content history searching unit 521 can search a change history stored in the change history DB 900. When a desired change history is requested to the SOI-content history searching unit 521 by selecting the SOI, the content, the use duration or the theme of use to be searched, the SOI-content history searching unit 521 searches the change history DB 900 to search the requested change history and extract a corresponding change history.

The SOI-content displayed history information editing unit 522 edits and changes the corresponding change history by referring to the SOI-content property information (COS property) with respect to the change history extracted by the SOI-content searching unit 521. As described above, the SOI-content property information (COS property) can be implemented as information that controls, for example, a type of the display device, whether to display a list, whether to display a summary/information inquiry on screen, whether to display on the map, whether to output an electronic file, or whether to print a hard copy, and show the searched change history in consideration of this.

Figure 9:
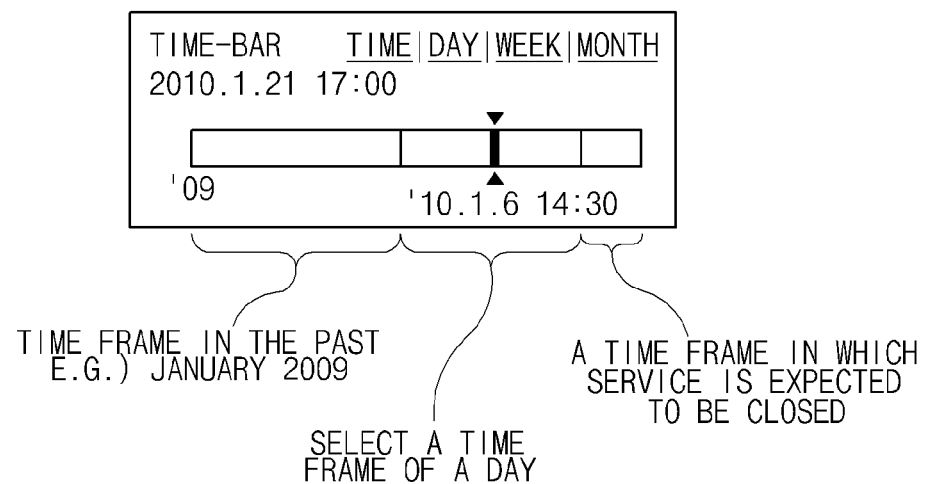
FIG. 9 is a view illustrating an exemplary embodiment of a time bar for enabling searching a modification history over time.

FIG. 9 is a view illustrating an exemplary embodiment of a time bar for enabling searching a modification history over time. When a user selects particular information, for example, the SOI, the contents, the duration of use, the theme of use, in association with a desired search, the user is enabled to select a time frame for identifying a change history of the SOI, the content, the SOI-content relationship information (COS object) or the SOI-content property information (COS property).

Figure 10:
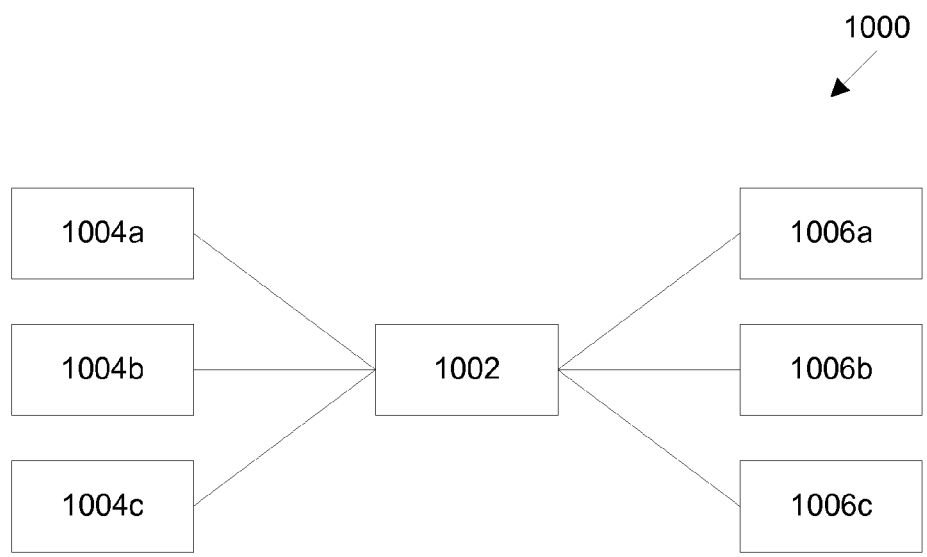
FIG. 10 depicts a network having a generalized topography in which aspects of the invention can be implemented.

Referring now to FIG. 10, the aspects and embodiments of the invention described herein can be implemented in a variety of embodiments including a network having a generalized topography 1000. Network can, for example, include one or more general-purpose computers 1002 programmed according to the disclosure herein to store and process SOI information.

This SOI information can, for example, be generated using the same or different general-purpose computers 1004. For example, a property owner, business owner, or other interested user can utilize computer 1004 to generate or modify information relating to SOI, content, themes, etc. The user can, for example, submit this information via a specially-programmed client program that is installed on computer 1004 or communicate with computer 1002 via one or more Web pages displayed on an Internet browser on computer 1004.

One or more end users can access information regarding SOI, content, themes, etc. through a variety of devices 1006 such as general-purpose computers (e.g., computers including network connections and Internet browsers), mobile telephones, smart phones (e.g., smart phones sold under the IPHONE® trademark by Apple Inc. of Cupertino, Calif.), tablets (e.g., tablets sold under the IPAD® trademark by Apple Inc. of Cupertino, Calif.), and the like. In still another embodiment, device 1006 can be a navigation or global positioning system that can be carried by a user or mounted in a motor vehicle (e.g., a car, truck, airplane, or boat) either during original assembly of the vehicle or post-sale.

Computer 1002 can include one or more memory and/or storage devices that can store computer program instructions and/or data. For example, SOI information and associated data can be stored in a database management system (DBMS) that implements a database or a file system. The database can be a relational database such as a SQL database. In such an embodiment, each category of data (e.g., SOI, content, etc.) can be stored in a separate table in which a unique ID for each datum can serve as a key. Relationships between data (e.g., SOI-content, SOI-SOI, content-content) can be represented by a data entry in still another table that includes an ID for the related data.

Devices 1002, 1004, 1006 can be operated through the execution of instructions stored on a computer readable medium. A "computer readable medium" shall be understood to mean any article of manufacture that contains data that can be read by a computer or a carrier wave signal carrying data that can be read by a computer. Such computer readable media includes, but is not limited to, magnetic media, such as a floppy disk, a flexible disk, a hard disk, reel-to-reel tape, cartridge tape, cassette tape or cards; optical media such as CD-ROM and writeable compact disc; magneto-optical media in disc, tape or card form; paper media, such as punched cards and paper tape; or on carrier wave signal received through a network, wireless network or modem, including radio-frequency signals and infrared signals.

The present invention, as described above, has the following effects.

First, by managing a unique identification relationship ID assigned to a connection between the relationship SOI and the contents, a connection relationship between the relationship SOI and the contents can be expandable through an additional extension/connection of the relationship IDs.

Second, by managing a management history of the relationship SOI and the contents, a change in the SOI, the content or the relationship can be systematically managed and a change history over time can be tracked.

In the above, although the embodiments of the present invention have been described with reference to the accompanying drawings, a person skilled in the art should apprehend that the present invention can be embodied in other specific forms without departing from the technical spirit or essential characteristics thereof. Thus, the embodiments described above should be construed as exemplary in every aspect and not limiting.

What is claimed is:

1. A system for managing a relationship or a history of a space of interest (SOI) containing information of a space having a certain area or structure and contents, the system comprising:

a computer having a memory that stores computer program instructions, which when executed by a processor, cause the computer to operate as a plurality of units including:

an SOI-content selection unit configured to (i) newly generate a desired SOI or contents or (ii) select a desired SOI or contents among existing SOIs or contents;

a term of use setting unit configured to set one or more selected from the group consisting of: a duration of use and a theme of use of the generated-or-selected SOI and contents;

an SOI-content relationship management unit configured to (i) generate SOI-content relationship information that indicates a relationship between the generated-or-selected SOI and the contents and (ii) manage the SOI-content relationship information;

an SOI-content history management unit configured to manage a change history over time when at least one of the SOI, the contents, and the SOI-content relationship information is changed by storing change history information including a time at which the change occurs; and an SOI-content history recovery unit configured to search for specific changes within the change history in response to an external request indicating a desired time or range of time, identify one or more specific changes within the change history associated with the desired time or range of time based on the stored change history information, and display information associated with the one or more identified specific changes, wherein the SOI comprises (i) an SOI ID that specifies the SOI and (ii) one or more selected from a group consisting of: location information that indicates a location of the SOI, exterior appearance information that indicates an exterior appearance of the SOI, and SOI time information that indicates time at which the SOI is generated.

2. The system according to claim 1, wherein, when the theme of use includes a plurality of SOIs and the SOI is included in the theme of use, SOI-SOI relationship information is created that indicates a relationship between the SOI and at least one of the other SOIs.

3. The system according to claim 2, wherein the SOI-SOI relationship information includes an SOI sequence number that sequentially indicates a relationship among the plurality of the SOIs.

4. The system according to claim 1, wherein the contents comprises a content ID that specifies the contents.

5. The system according to claim 1, wherein the contents comprise one or more selected from the group consisting of: content information that indicates the contents and content time information that indicates a time at which the contents were generated.

6. The system according to claim 1, wherein, when the theme of use includes one or more contents, and the content is included in the theme of use, content-content information is created that indicates a relationship between the content and at least one of the other contents.

7. The system according to claim 6, wherein the content-content relationship information comprises:
a first content ID that specifies the content; and
a second content ID that specifies the other content included in the theme of use.

8. The system according to claim 6, wherein the content-content relationship information includes a content sequence number that indicates a relationship among the plurality of the contents according to contents of the theme of use.

9. The system according to claim 1, wherein the SOI-content relationship management unit manages the contents of the SOI through (i) the SOI-content relationship information indicating the relationship between the generated-or-selected SOI and contents included in the contents of the SOI and (ii) SOI-content property information indicating display property of the contents of the SOI.

10. The system according to claim 9, wherein each of the SOI-content relationship information and the SOI-content property information include a relationship ID, which is directly mapped to the generated-or-selected SOI and contents.

11. The system according to claim 10, wherein the relationship ID comprises a SOI ID of the generated-or-selected SOI or a content ID of the generated-or-selected content.

12. The system according to claim 9, wherein the SOI-content relationship information comprises:
a relation user ID indicating a user who requests for connection between the generated-or-selected SOI and contents; and
a relation mapping time indicating a time at which the contents of the SOI were generated.

13. The system according to claim 1, wherein the theme of use includes a plurality of contents of SOIs and the SOI-content relationship information includes a content of SOI sequence number that sequentially indicates a relationship among the plurality of the SOIs.

14. The system according to claim 9, wherein the SOI-content property information comprises:
display device information indicating a type of a display device on which the contents of the SOI are displayed.

15. The system according to claim 10, wherein the SOI-content property information comprises one or more selected from the group consisting of: display information for visually displaying the contents of the SOI and scale information indicating a map scale of a map on which the contents of the SOI are displayed.

16. The system according to claim 15, wherein the display information includes information about one or more selected from the group consisting of: a type, a color, and a thickness of a line for visually representing the contents of the SOI, wherein the type, the color, the thickness of the line is controlled in response to the scale information or display device information.

17. The system according to claim 10, wherein the SOI-content relationship information and the SOI-content property information are modifiable in response to an external request.

18. The system according to claim 10, wherein the SOI-content history management unit is configured to determine, when at least one of the SOI, the contents, the SOI-content relationship information and the SOI-content property information is changed, whether a change is to be managed as the change history and configured to store a corresponding change that is determined to be managed as the change history in a change history database (DB) according to a type thereof.

19. A method for managing a relationship or a history of a space of interest (SOI) containing information of a space having a certain area or structure and contents, the method comprising:
newly generating, by a computer having a memory that stores computer program instructions, a desired SOI or contents or selecting the desired SOI or contents among existing SOIs or contents;
setting, by the computer, one or more selected from the group consisting of: a duration of use and a theme of use of the generated-or-selected SOI and contents;
generating, by the computer, SOI-content relationship information that indicates a relationship between the generated-or-selected SOI and the contents and managing the SOI-content relationship information;

managing, by the computer, a change history over time when at least one of the SOI, the contents, and the SOI-content relationship information is changed by storing change history information including a time at which the change occurs;

searching, by the computer, for specific changes within the change history in response to an external request indicating a desired time or range of time;

identifying, by the computer, one or more specific change, within the change history associated with the desired time or range of time based on the stored change history information;

displaying, by the computer, information associated with the one or more identified specific changes, wherein the SOI comprises (i) an SOI ID that specifies the SOI and (ii) one or more selected from a group consisting of: location information that indicates a location of the SOI, exterior appearance information that indicates an exterior appearance of the SOI, and SOI time information that indicates time at which the SOI is generated.

20. A non-transitory computer program product comprising computer-usable medium having control logic stored therein for causing a computer to perform a method for managing a relationship or a history of a space of interest (SOI) containing information of a space having a certain area or structure and contents, the control logic comprising computer readable program code means for causing the computer to:

newly generate a desired SOI or contents or select the desired SOI or contents among existing SOIs or contents;

set one or more selected from the group consisting of: a duration of use and a theme of use of the generated-or-selected SOI and contents;

generate SOI-content relationship information that indicates a relationship between the generated-or-selected SOI and the contents and managing the SOI-content relationship information;

manage a change history over time when at least one of the SOI, the contents, and the SOI-content relationship information is changed by storing change history information including a time at which the change occurs;

search for specific changes within the change history in response to an external request indicating a desired time or range of time;

identify one or more specific changes, within the change history associated with the desired time or range of time based on the stored change history information; and display information associated with the one or more identified specific changes, wherein the SOI comprises (i) an SOI ID that specifies the SOI and (ii) one or more selected from a group consisting of: location information that indicates a location of the SOI, exterior appearance information that indicates an exterior appearance of the SOI, and SOI time information that indicates time at which the SOI is generated.

* * * * *